United States Patent [19]
Nagano

[11] 4,181,033
[45] Jan. 1, 1980

[54] SPROCKET FOR BICYCLES
[75] Inventor: Masashi Nagano, Sakai, Japan
[73] Assignee: Shimano Industrial Company Limited, Osaka, Japan
[21] Appl. No.: 862,239
[22] Filed: Dec. 19, 1977
[30] Foreign Application Priority Data
Dec. 28, 1976 [JP] Japan .......................... 51-175430[U]
[51] Int. Cl.² ........................................ F16H 55/30
[52] U.S. Cl. ..................................... 74/243 R; 74/457
[58] Field of Search ................ 74/243 R, 217 B, 229, 74/242.11 B, 242.14 B, 242.15 B, 443, 457, 458, 462, 446, 447, 449

[56] References Cited
U.S. PATENT DOCUMENTS

| 104,119 | 6/1870 | Cowles | 74/243 R |
|---|---|---|---|
| 1,221,471 | 4/1917 | Miller | 74/243 R |
| 2,047,820 | 7/1936 | Cramer | 74/243 R |
| 3,469,465 | 9/1969 | Bebbington, Jr. et al. | 74/243 R |
| 3,709,053 | 1/1973 | Ohshita | 74/243 R |
| 3,772,932 | 11/1973 | Nagano | 74/243 R |
| 3,956,943 | 5/1976 | Yamasaki | 74/243 R |

FOREIGN PATENT DOCUMENTS

| 282459 | 4/1952 | Fed. Rep. of Germany | 29/159.2 |
|---|---|---|---|
| 1029832 | 6/1953 | France | 74/243 R |

Primary Examiner—Samuel Scott
Assistant Examiner—William R. Henderson
Attorney, Agent, or Firm—Stevens, Davis, Miller & Mosher

[57] ABSTRACT

Sprockets for a bicycle are disclosed which comprise sprocket bodies and a plurality of teeth circumferentially provided at the outer peripheries of the bodies respectively, at least one of the teeth on a sprocket body being slanted at its tip with respect to the center line of axial thickness of the sprocket body.

8 Claims, 5 Drawing Figures

SPROCKET FOR BICYCLES

This invention relates to sprockets for a bicycle, and more particularly to sprockets which are provided at the outer peripheries thereof with a plurality of teeth in mesh with a driving chain so that a driving force created by pedalling may be transmitted to a rear wheel of the bicycle.

Generally, a bicycle is adapted to transmit a driving force by pedalling to a rear wheel at a prescribed speed-change ratio in such a manner that two or more sprockets containing a different number of teeth are combined for mounting to a rear hub or front crank. The driving chain is shifted axially of the sprockets through a rear or a front derailleur so as to be switched to a selected one of the sprockets.

A conventional sprocket, however, has teeth whose tips are disposed parallel to the lateral surface of the sprocket body, in other words, along the center line of axial thickness of the body. When the driving chain is shifted by the derailleur for changing the bicycle speed, especially when shifted from a sprocket smaller in diameter and number of teeth to one larger in diameter and number of teeth, a link plate of the driving chain is in contact with a tip of a sprocket tooth causing interference with each other, thereby hindering the chain from meshing quickly and smoothly with the teeth. As a result, the meshing of the chain with the sprocket is slow, causing idling or the generation of noise between the chain and sprocket.

The present invention has been designed to overcome these problems. A main object of the invention is to provide sprockets for a bicycle, which are, when combined into an assembly of two or more sprockets, adapted to be selectively switched to the driving chain through the derailleur while being capable of meshing without hindrance such as by interference with a link plate of the driving chain coming in contact with the tip of a tooth. The invention allows the driving chain to be slidable to be quickly meshed and evenly contacted with the tip of a tooth thereby eliminating idling or noise created between the chain and sprocket when changing speed.

This invention is characterized in that the tip of at least one of the teeth circumferentially provided at the outer periphery of the sprocket body is slanted with respect to the center line of axial thickness of the body, so that the driving chain may, when shifted by the derailleur for changing the speed, be switched to a selected one of the sprockets without hindrance due to the side edge of the link plate of the chain coming in contact with the tip of the tooth, and be evenly contacted therewith and easily slidable to be quickly meshed with the sprocket.

Further objects and advantages of the present invention will be apparent from the following description, reference being had to the accompanying drawings, wherein a preferred embodiment of the present invention is clearly shown, in the drawings.

Figure 1:
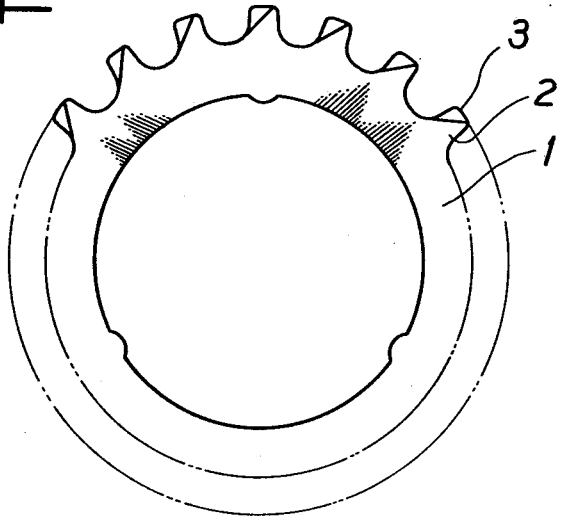
FIG. 1 is a front view of the sprocket of the invention.
Figure 2:
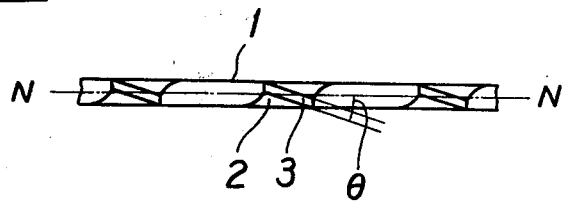
FIG. 2 is a partially enlarged plan view thereof.

Referring to the drawings, the reference numeral 1 designates a body of the sprocket having teeth 2 circumferentially provided at the outer periphery thereof. The tips 3 of the teeth 2 are slanted with respect to the center line N—N of the axial thickness of the body 1, as shown in FIG. 2. The slanted tip 3 is provided on at least one of the plurality of teeth 2. If two or more teeth are slanted at the tips thereof, each tooth may be changed in its slanting direction as shown in FIG. 5. When two or more sprockets are combined into the multi-speed sprocket, the speed-change performance becomes a problem when the driving chain is switched from a smaller diameter sprocket to a larger diameter one, that is, when changing the speed from low to high. Hence, it is preferable to slant the tip 3 in the direction shown by the arrow X in FIG. 4, that is, the front end of tip 3 in the rotation direction of the sprocket is directed toward a side of the smaller diameter sprocket (the right side in FIG. 4). In this instance, the slant angle $\theta$ is, when the tip is 2 mm thick, made approximately 16° with respect to the center line and the tip 3 occupies at both lengthwise ends thereof, the full thickness of the sprocket body 1.

Figure 3:
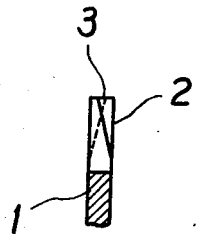
FIG. 3 is a cross sectional view of the tip of a tooth.

The tip 3 is slanted in such a manner that the tooth 2 is formed in width identical with the thickness of the sprocket body 1 and then is chamfered at one side as shown by the solid line in FIG. 3 and at the other side reversely chamfered as shown by the dotted line, or is chamfered at both sides in parallel to the center line and then twisted under pressure.

The individual sprockets constructed as above are combined into a set of two or more sprockets each having a different number of teeth. The set is mounted to the crank or rear hub and used as a front gear or rear freewheel. The driving chain 4 is shifted by the derailleur to one of the sprockets to thereby transmit the driving force from pedalling to the rear wheel at the predetermined speedchange ratio.

Next, the manner in which chain 4 meshes with a selected sprocket when switched by the derailleur will be described.

Figure 4:
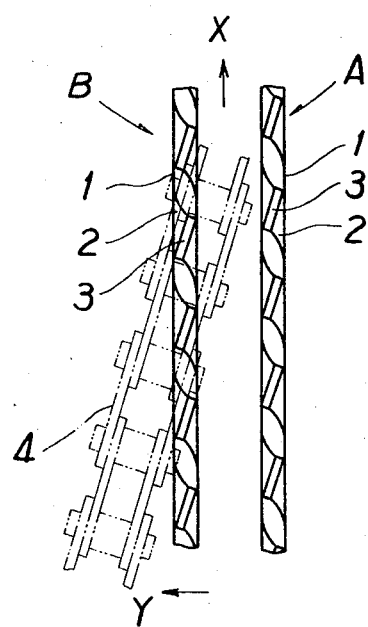
FIG. 4 is an illustration of a meshing condition of the sprocket teeth with the driving chain.
Figure 5:
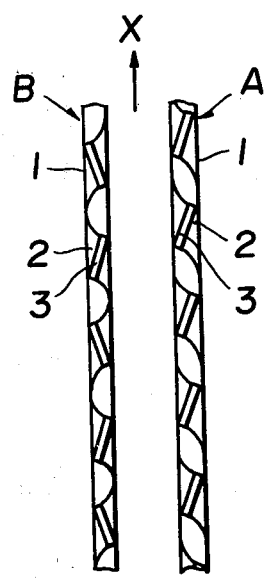
FIG. 5 is a partially enlarged plan view of an alternative tooth arrangement.

Referring to FIG. 4, when the chain 4 in mesh with a second sprocket A smaller in diameter and number of teeth is shifted in the direction of the arrow Y by the derailleur for switching to a first sprocket B larger in diameter and number of teeth, a portion of the chain 4 in advance of the rotation direction X of the sprockets A and B tends to stay at the second sprocket A and a position at a side of the operating derailleur is shifted over the first sprocket B and is slanted as shown in FIG. 4.

At this time, the tip 3 of the tooth 2, which is located at the front side of the first sprocket B in the rotation direction thereof and tends to be meshed with the chain 4, is slanted in the same manner as the slanted chain 4. Therefore, the chain 4 is free from interference caused by its link plate being in contact at its side edge with the tip 3 of a tooth 2, and also is, slid in even contact so as to immediately mesh with the tooth 2.

On the other hand, the tip 3 of tooth 2 of the second smaller diameter sprocket A is slanted in the same manner as a tooth on sprocket B. Hence, the chain 4 still in mesh with the second sprocket A starts to leave it smoothly and rapidly, thus being quickly switched to the larger diameter sprocket B in accompanyment with the aforesaid quick and smooth mesh of the driving chain with the first larger diameter sprocket B.

As seen from the aforesaid description, the sprocket of the invention has its tooth tip slanted with respect to the center line of axial thickness of the sprocket body, so that the driving chain meshes quickly and smoothly with a selected one of the sprockets when changing speed by means of the derailleur and also may readily leave the sprocket with which the chain is still in mesh, always resulting in an exact and quick switching of the driving chain to the selected sprocket for changing the speed.

Accordingly, no idling caused by chain shift lag occurs, and also noise created when shifting the chain, can reliably be eliminated.

While an embodiment of the invention has been shown and described, the invention is not limited to the specific construction thereof, which is merely examplary.

What is claimed is:

1. A sprocket for a bicycle which facilitates chain meshing, comprising a body formed as a plate and a plurality of teeth circumferentially provided co-planarly at the outer periphery of said body along the center line of axial thickness of said body, at least one of said plurality of teeth being slanted at its tip with respect to said center line of axial thickness of said body.

2. The sprocket for the bicycle according to claim 1, wherein two or more teeth of the plurality of teeth circumferentially provided at the outer periphery of said sprocket body are slanted at the tips in the same direction respectively with respect to the center line of axial thickness of said sprocket body.

3. A sprocket assembly for a bicycle which facilitates chain meshing comprising at least first and second sprocket bodies of different diameters, each of said first and second sprocket bodies being formed as a plate and having at its outer periphery a plurality of co-planar teeth along the center line of axial thickness of its respective body, at least one of said teeth on each sprocket body being slanted at the tip thereof with respect to said center line of axial thickness of its respective sprocket body.

4. A sprocket assembly according to claim 3, wherein said first sprocket body has a larger diameter than said second sprocket body, said first sprocket body having at least one tooth whose tip is slanted such that the front end thereof in the rotation direction of said first sprocket body is directed toward said second smaller diameter sprocket body, and said second sprocket body having at least one tooth whose tip is slanted such that the rear end thereof in the rotation direction of the second sprocket body is directed toward said first sprocket body.

5. A sprocket assembly for a bicycle according to claim 3, wherein the tips of the slanted teeth of said first and second sprockets are slanted at the angle of about 16° with respect to the center line of axial thickness of a respective sprocket body.

6. A sprocket assembly for a bicycle according to claim 3 wherein all the teeth on said first and second sprocket bodies are slanted at the tips thereof with respect to the center line of axial thickness of a respective sprocket body.

7. A sprocket assembly for a bicycle according to claim 3 wherein at least two teeth on one of said first and second sprocket bodies are slanted with respect to the center line of axial thickness of their sprocket bodies, each of said two teeth being slanted in a direction different from that of the other.

8. The combination of a bicycle chain and a sprocket which facilitates chain meshing engaging therewith comprising an endless bicycle chain composed of a plurality of interconnected links, each link including a pair of parallel link plates, a sprocket having a plurality of circumferential teeth engaging with said links between said link plates, said sprocket having a body formed as a plate with said teeth being co-planarly provided along the center line of axial thickness of said body, at least one of said teeth having a tip portion which is slanted with respect to said center line of axial thickness of said body and a non-slanted bottom portion co-planar with said body.

* * * * *